E. A. Field.
Cotton Bale Tie.
Nº 50,925.  Patented Nov. 14, 1865.
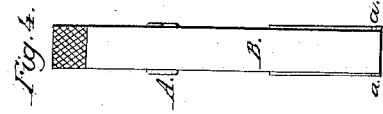
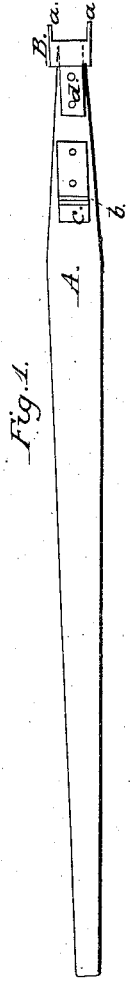
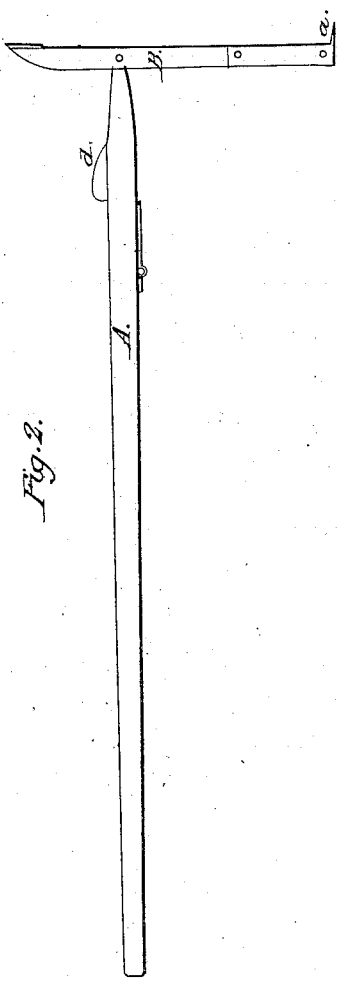
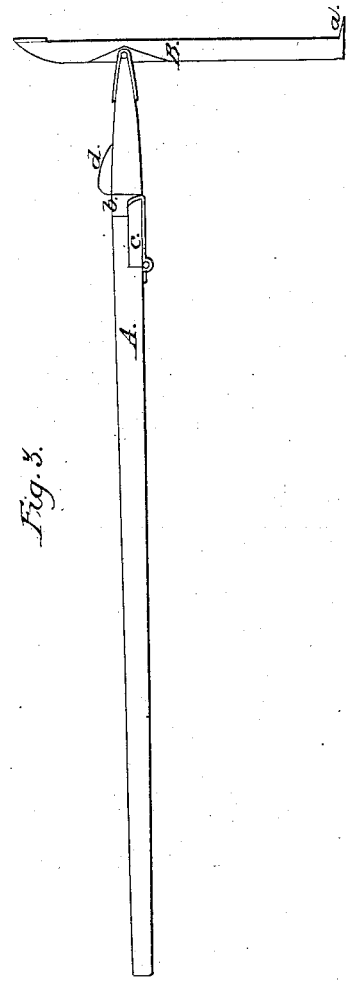
Witnesses:
Frederick Curtis
G. H. Washburn.
Inventor:
E. A. Field.
by his attorney
R. H. Eddy

UNITED STATES PATENT OFFICE.

EDWD. A. FIELD, OF SIDNEY, MAINE.

IMPROVEMENT IN BALE-HOOP STRAINER.

Specification forming part of Letters Patent No. 50,925, dated November 14, 1865.

*To all whom it may concern:*

Be it known that I, EDWARD A. FIELD, of Sidney, in the county of Kennebec and State of Maine, have invented a new and useful or Improved Bale-Hoop Strainer; and I do hereby declare the same to be fully described in the following specification and represented in the accompanying drawings, of which—

Figure 1 is a top view, Fig. 2 a side elevation, Fig. 3 a longitudinal section, and Fig. 4 a front view, of it.

In the said drawings, A denotes a lever, which is hinged at one end to a holding-bar, B, provided at its foot with spurs projecting from it, as shown at $a\ a$. The said lever has a hole or passage, $b$, made through it, and furnished with a movable jaw, $c$, which is arranged in the lever and with respect to the said passage in manner as shown in Figs. 2 and 3, the said jaw being hinged at its rear end to the lever. A cushioning-block, $d$, rounded on its upper surface, as shown in Figs 2 and 3, is fixed on the upper side of the lever and against the front side of the hole or passage $b$.

The bale-hoop strainer so made is designed to be used for the purpose of straining a hoop around a bale of hay preparatory to such hoop being nailed to the boards or staves employed in keeping the hay together.

In using the article its holding-bar B is to be brought up against the side of the bale or against the same and the hay-press while the bale may be therein, and one end of the hoop should be passed through the hole $b$, the lever being first duly raised to receive the hoop. On depressing the lever the jaw will clamp the hoop to the passage, so as to enable the lever to draw the hoop tightly around the bale. The cushioning-block will operate to prevent breakage of the fibers of the hoop at its bend into the passage $b$.

I claim—

1. The bale-hoop strainer composed of the holding-bar B, the lever A, the passage $b$, and the jaw $c$, arranged and applied together substantially as described.

2. The combination of the cushioning-block $d$, the lever A, the passage $b$, the jaw $c$, and the holding-bar B, the whole being arranged to operate substantially in manner and for the purpose as specified.

EDWARD A. FIELD.

Witnesses:
R. H. EDDY,
F. P. HALE, Jr.